(12) United States Patent
Hu

(10) Patent No.: US 8,369,085 B2
(45) Date of Patent: Feb. 5, 2013

(54) ROTATING SHAFT STRUCTURE FOR SCREEN AND FOLDABLE PORTABLE ELECTRONIC DEVICE

(75) Inventor: Li-Hau Hu, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 190 days.

(21) Appl. No.: 12/853,345

(22) Filed: Aug. 10, 2010

(65) Prior Publication Data

US 2011/0069431 A1    Mar. 24, 2011

(30) Foreign Application Priority Data

Sep. 18, 2009 (TW) .............................. 98131606 A

(51) Int. Cl.
*H05K 5/00* (2006.01)
*H05K 7/00* (2006.01)
(52) U.S. Cl. .......... 361/679.55; 361/679.26; 361/679.27
(58) Field of Classification Search ............. 361/679.26, 361/679.27, 679.55
See application file for complete search history.

(56) References Cited

U.S. PATENT DOCUMENTS

| | | | | |
|---|---|---|---|---|
| 5,987,704 | A * | 11/1999 | Tang ................................ | 16/354 |
| 6,191,937 | B1 * | 2/2001 | Bang ........................ | 361/679.23 |
| 6,266,236 | B1 * | 7/2001 | Ku et al. ................... | 361/679.27 |
| 6,445,573 | B1 * | 9/2002 | Portman et al. .......... | 361/679.27 |
| 6,505,382 | B1 * | 1/2003 | Lam et al. ....................... | 16/325 |
| 6,513,197 | B2 * | 2/2003 | Rude et al. ...................... | 16/342 |
| 7,147,191 | B2 | 12/2006 | Ichikawa et al. | |
| 7,599,188 | B2 * | 10/2009 | Chen ............................. | 361/729 |
| 7,787,242 | B2 * | 8/2010 | Schwager et al. ........ | 361/679.28 |
| 2005/0205735 | A1 | 9/2005 | Ichikawa et al. | |

FOREIGN PATENT DOCUMENTS

JP          2005273739 A        10/2005

* cited by examiner

*Primary Examiner* — Anthony Haughton
(74) *Attorney, Agent, or Firm* — Alan Kamrath; Kamrath IP Lawfirm, P.A.

(57) ABSTRACT

A rotating shaft structure for a screen is used for a foldable portable electronic device. The rotating shaft structure includes a fixing element, a first pivot element, and a second pivot element. The fixing element includes a fixing base and a pivot hole. The fixing base is connected to the foldable portable electronic device. The first pivot element can be pivoted in relation to the fixing element via the pivot hole. The second pivot element is disposed on the fixing element and adjacent to the first pivot element. When the pivoting angle is in a specific pivoting angle range, the first pivot element is pivoted to drive the second pivot element to increase the torsion of the rotating shaft structure.

14 Claims, 8 Drawing Sheets

ROTATING SHAFT STRUCTURE FOR SCREEN AND FOLDABLE PORTABLE ELECTRONIC DEVICE

BACKGROUND OF THE INVENTION

1. Field of the Invention

The present invention relates to a rotating shaft structure for a screen and a foldable portable electronic device, and more particularly, to a rotating shaft structure for a screen and a foldable portable electronic device, which can increase the torsion for a specific angle range during the cover opening/closing processes.

2. Description of the Related Art

Foldable electronic devices such as notebook computers are electronic equipment commonly seen every day. When a user tries to open or close a cover of a notebook computer, due to its foldable design, the user has to apply suitable torsion to successfully open/close the cover.

Please refer to FIG. 1 for a view illustrating a relation between the pivoting angle and the torsion value of a prior art rotating shaft structure. In FIG. 1, the horizontal axis denotes the pivoting angle of a foldable electronic device, the vertical axis denotes the torsion value, the upper curve denotes the cover opening process, and the lower portion denotes the cover closing process. The characteristics of a traditional rotating shaft structure for a screen are the symmetrical relationships between the torsion curve representing the cover opening process and that representing the cover closing process. That the torsion value of segment AB equals that of segment GH, and the torsion value of segment CD equals that of segment EF.

However, in some cases, it is necessary to increase the torsion for a specific angle range. For example, when a user uses a notebook computer with a touch screen, it takes more torsion for the user to turn the cover open to an operation state (with the pivoting angle ranging from, for example, 100 to 130 degrees). However, it takes less torsion to close the cover during operation. On the other hand, when the cover closing process proceeds to a specific angle range (with the pivoting angle ranging from, for example, 70 to 30 degrees), it requires more torsion to support the screen to prevent accidental falling of the screen due to the user releasing his/her hand and the resultant damage to the internal structure of the notebook computer.

However, presently there are no designs available to form asymmetric torsion curves related to the cover opening/closing processes respectively. That is, it is not possible at this time to increase the torsion of the rotating shaft structure for specific angle ranges during the cover opening/closing processes to facilitate the user's operation.

Therefore, it is necessary to provide a rotating shaft structure for a screen and a foldable portable electronic device to solve the problems of the prior art techniques.

SUMMARY OF THE INVENTION

It is an object of the present invention to provide a rotating shaft structure for a foldable portable electronic device, which can increase the torsion for a specific angle range during the cover opening/closing process.

It is another object of the present invention to provide a foldable portable electronic device that can increase the torsion for a specific angle range during the cover opening/closing process.

In order to achieve the above objects, the rotating shaft structure comprises a fixing element, a first pivot element, and a second pivot element. The fixing element comprises a fixing base and a pivot hole. The fixing base is connected to the foldable portable electronic device. The first pivot element can be pivoted in relation to the fixing element via the pivot hole. The second pivot element is disposed on the fixing element and adjacent to the first pivot element. When the pivoting angle is in a specific pivoting angle range, the first pivot element is pivoted to drive the second pivot element to increase the torsion of the rotating shaft structure.

In order to achieve the other object of the present invention, the foldable portable electronic device comprises a body, a cover, and a rotating shaft structure pivotally connected with one other to form a pivoting angle between the body and the cover. The rotating shaft structure comprises a fixing element, a first pivot element, and a second pivot element. The fixing element comprises a fixing base and a pivot hole, and the fixing base is connected on the foldable portable electronic device. The first pivot element is pivoted in relation to the fixing element via the pivot hole. The second pivot element is disposed on the fixing element and adjacent to the first pivot element. Thus, when the pivoting angle is in a specific pivoting angle range, the first pivot element is pivoted to drive the second pivot element to increase torsion.

DETAILED DESCRIPTION OF THE PREFERRED EMBODIMENTS

The advantages and innovative features of the invention will become more apparent from the following detailed description when taken in conjunction with the accompanying drawings.

Figure 2:
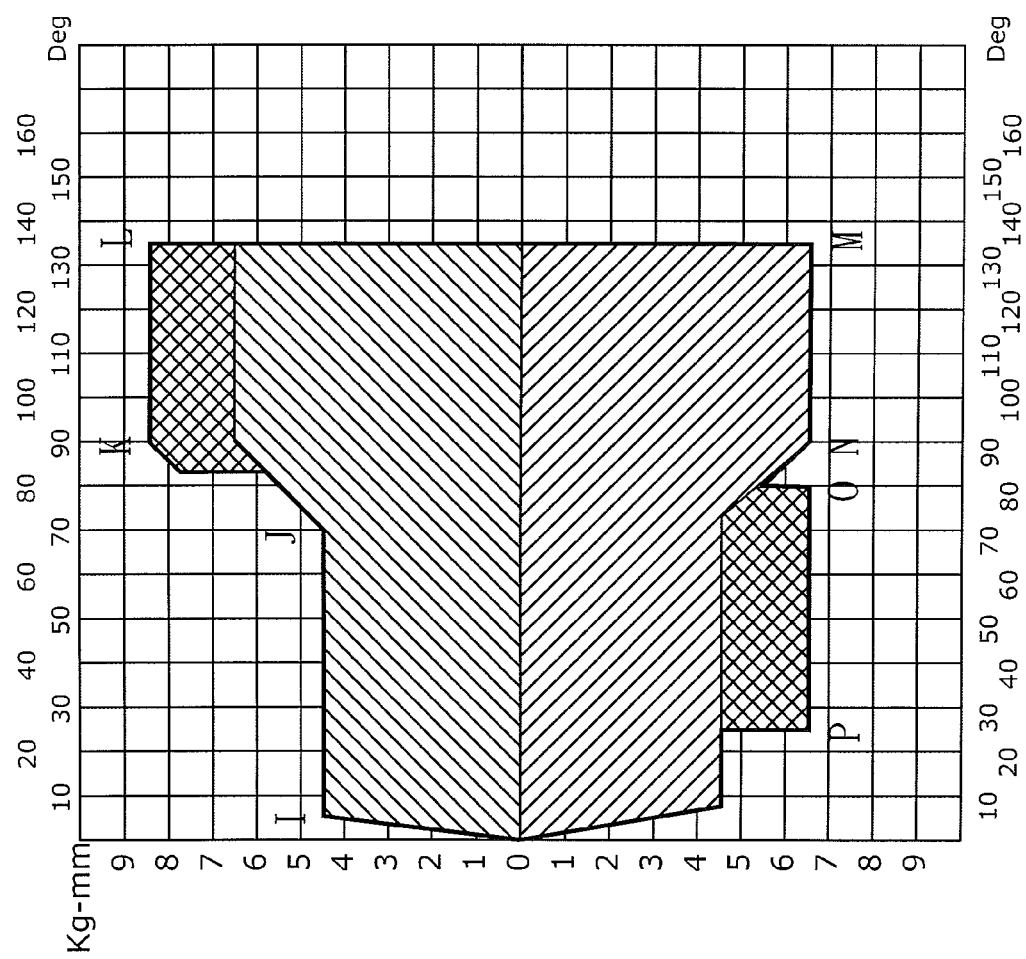
FIG. 2 illustrates a view of a relation between the pivoting angle and the torsion value of a rotating shaft structure for a screen in the present invention.
Figure 3:
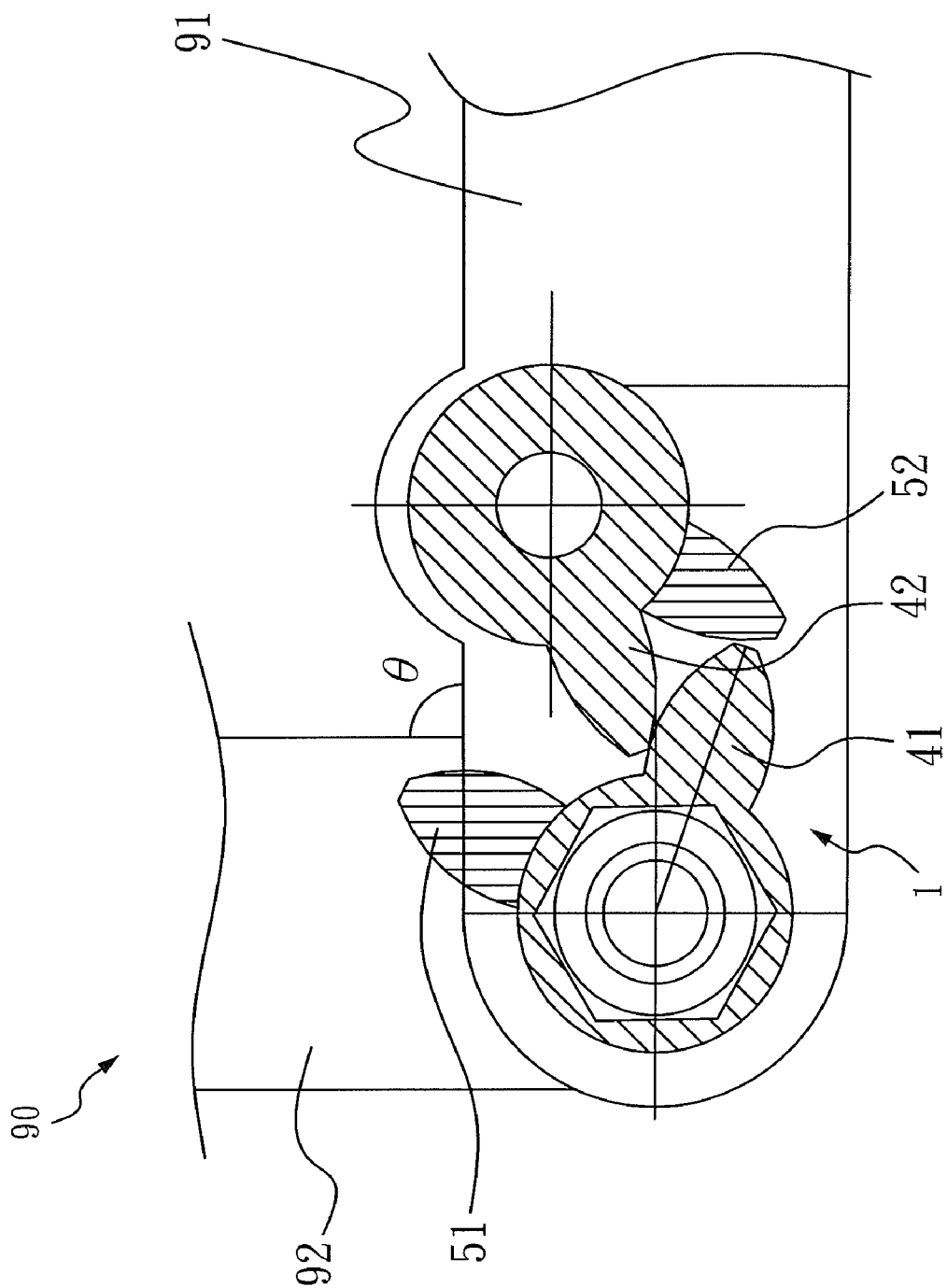
FIG. 3 to FIG. 5 illustrate views of the rotating shaft structure having a pivoting angle of 90 degrees when the cover is open in the present invention.
Figure 4:
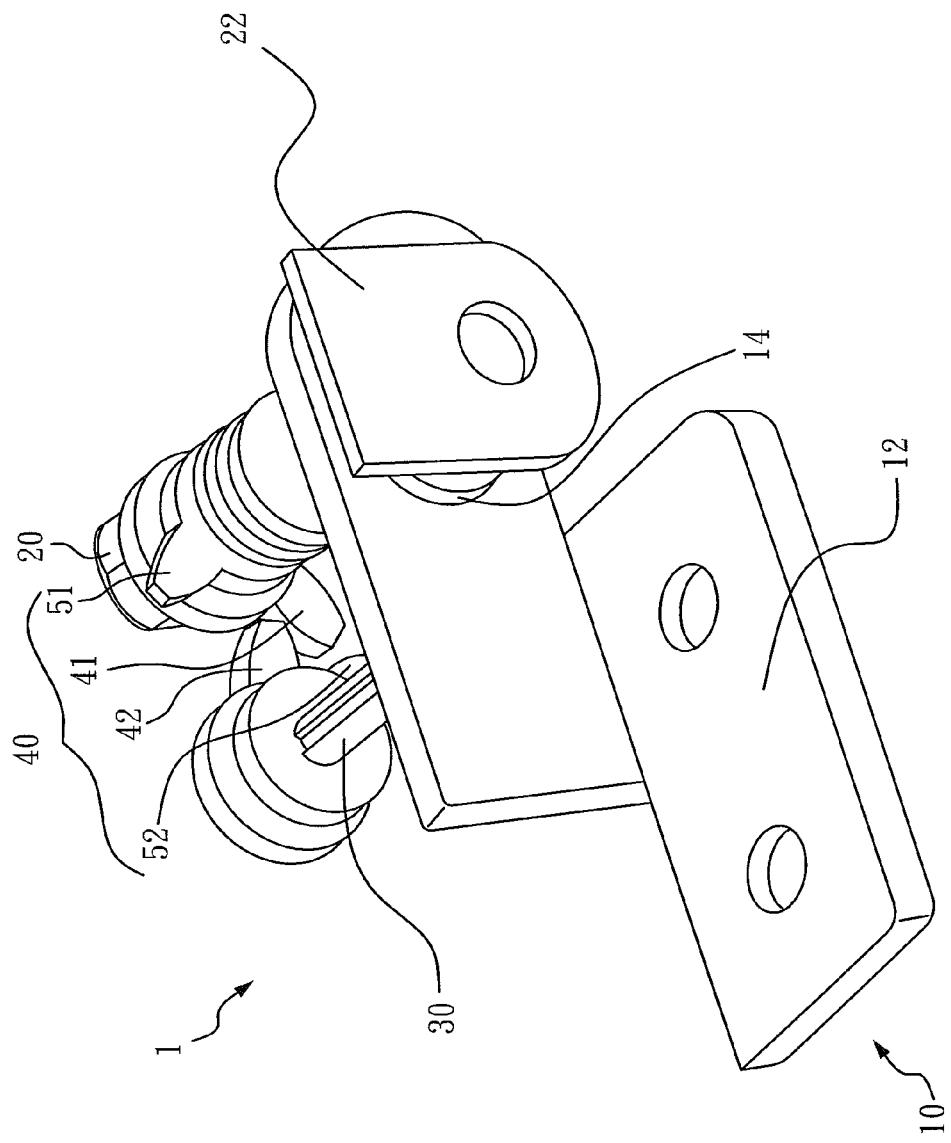
Figure 5:
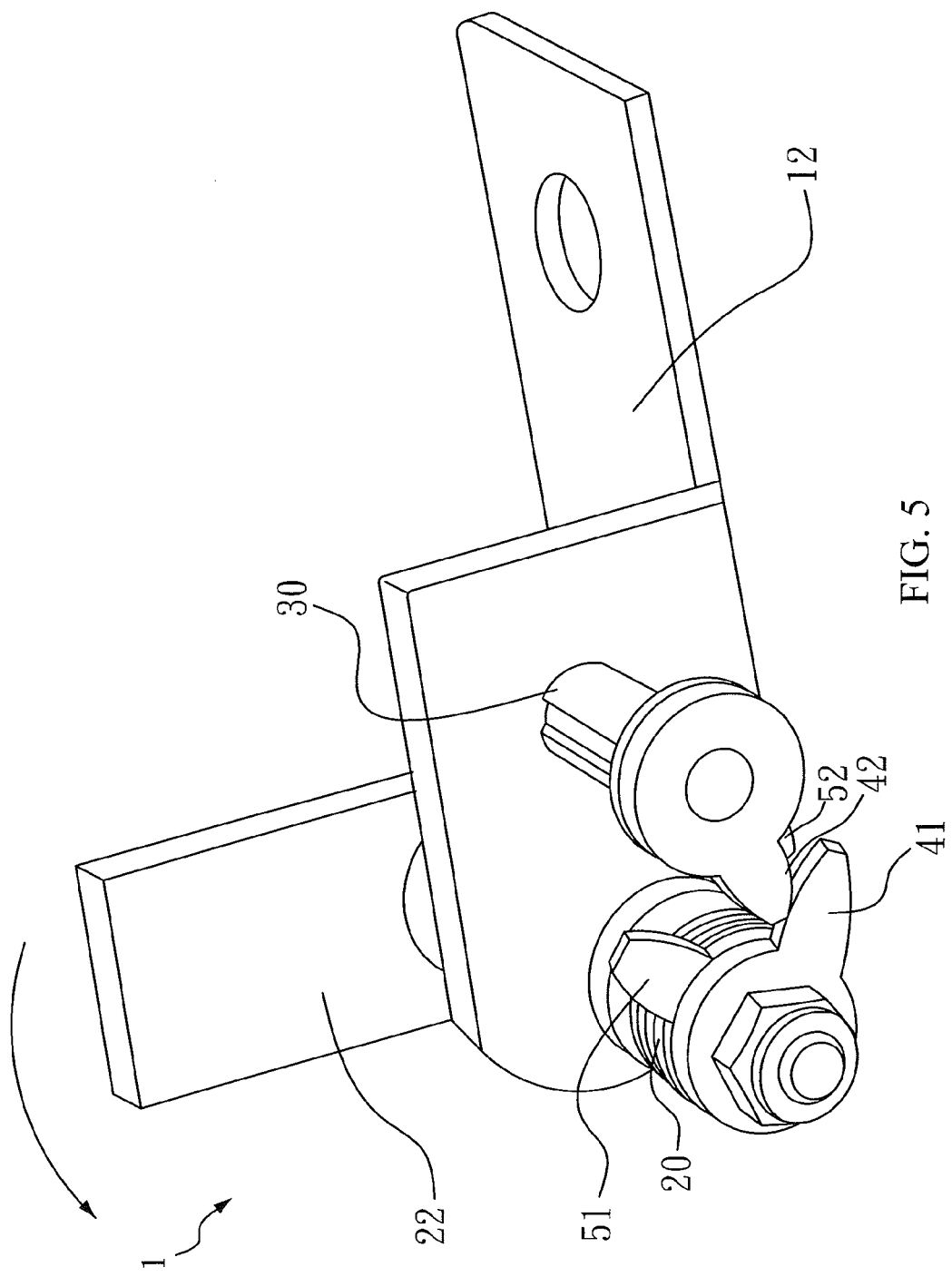

Please refer to FIG. 2 to FIG. 5 at the same time. FIG. 2 illustrates a view of a relation between the pivoting angle and the torsion value of a rotating shaft structure for a screen in the present invention; FIG. 3 illustrate a view of a foldable portable electronic device; FIG. 4 illustrates a 3D view of a rotating shaft structure; and FIG. 5 illustrates a 3D view of the rotating shaft structure from another angle. It is noted that FIG. 3 to FIG. 5 all show the rotating shaft structure having a pivoting angle of 90 degrees when the cover is open.

As shown in FIG. 3, the foldable portable electronic device 90 comprises a body 91, a cover 92, and a rotating shaft structure 1. The cover 92 is pivotally connected to the body 91 to form a pivoting angle θ, and the pivoting angle θ can be adjusted according to practical uses.

As shown in FIG. 4, the rotating shaft structure 1 comprises a fixing element 10, a first pivot element 20, and a second pivot element 30.

The fixing element 10 comprises a fixing base 12 and a pivot hole 14, and the fixing base 12 is connected on the foldable portable electronic device 90. In this embodiment, the fixing base 12 is fixed to the body 91.

The first pivot element 20 can generate torsion, such that the first pivot element 20 can be pivoted in relation to the fixing base 12 via the pivot hole 14. In this embodiment, the body 91 is pivotally connected to the cover 92 via the first pivot element 20. That is, the first pivot element 20 acts as a rotating axis of the foldable portable electronic device 90.

In this embodiment, the first pivot element 20 comprises a torsion generator, and the torsion generator generates torsion which changes along with the pivoting angle θ. The first pivot element 20 can be a prior art torsion generator having a torsion curve such as that shown in FIG. 1. It is noted that the first pivot element 20 can have different structures and torsion curves other than those described above. For example, the torsion generator can comprise elements such as a friction type rotating shaft or torsion spring.

In this embodiment, the first pivot element 20 is fixed to the cover 92 via the rotating element 22 (please refer to both FIG. 3 and FIG. 4).

The second pivot element 30 can also generate torsion. The second pivot element 30 is disposed on the fixing element 10 and is adjacent to the first pivot element 20. When the pivoting angle .theta. is in a specific pivoting angle θs, the first pivot element 20 is pivoted to drive the second pivot element 30 to increase the torsion of the rotating shaft structure 1.

In this embodiment, the second pivot element 30 also comprises an auxiliary torsion generator. Since the second pivot element 30 works to help the first pivot element 20, the torsion generated by the second pivot element 30 is generally smaller than that of the first pivot element 20.

The first pivot element 20 comprises a first gear portion 41 and a third gear portion 51, and the second pivot element 30 comprises a second gear portion 42 and a fourth gear portion 52. The first gear portion 41, the second gear portion 42, the third gear portion 51, and the fourth gear portion 52 jointly form a gear set 40 for linking the first pivot element 20 and the second pivot element 30. However, the gear set 40 works only when the pivoting angle .theta. is in a specific pivoting angle θ. When that condition is met, the first pivot element 20 links and works with the second pivot element 30. In addition, the torsion of the rotating shaft structure 1 is increased when the first pivot element 20 links with the second pivot element 30.

In this embodiment, the first gear portion 41 and the second gear portion 42 (as shown in FIG. 4) can be a set of mutually engaged gears, and the third gear portion 51 and the fourth gear portion 52 can be another set of mutually engaged gears. The first gear portion 41 and the third gear portion 51 jointly form a specific angle (which is slightly L-shaped in this embodiment), and the second gear portion 42 and the fourth gear portion 52 form a specific angle (which is slightly V-shaped in this embodiment). Furthermore, the positions of the first gear portion 41, the second gear portion 42, the third gear portion 51, and the fourth gear portion 52 correspond to one another.

It is noted that the first pivot element 20 can link with the second pivot element 30 via different mechanisms other than the gear set. For example, the first pivot element 20 can link with the second pivot element 30 via a cam structure.

The specific pivoting angle θ comprises a specific opening angle range, and a specific closing angle range, and the specific opening angle range is not the same as the specific closing angle range. When the pivoting angle θ gradually increases and enters the specific opening angle range, the first gear portion 41 contacts with and drives the second gear portion 42 to increase the torsion of the rotating shaft structure 1. Generally, the specific opening angle range is between 80 degrees to 150 degrees, However, the specific opening angle range is not limited to the range of 80 degrees to 150 degrees.

When the pivoting angle θ gradually decreases and enters the specific closing angle range, the third gear portion 51 contacts with and drives the fourth gear portion 52 to increase the torsion of the rotating shaft structure 1. One of the characteristics of the present invention is that the specific closing angle range is not the same as the specific opening angle range. Generally, the specific closing angle range is between 80 degrees to 20 degrees. However, the specific closing angle range is not limited to 80 degrees to 20 degrees.

The present invention is now described according to its practical operation in steps. In this embodiment, the specific opening angle range is set to be between 90 degrees to 142 degrees, and the specific closing angle range is set to be between 77 degrees to 25 degrees.

1. The Cover Opening Stage:

(1) the pivoting angle θ increases from 0 degrees to less than 90 degrees (0°<θ<90°):

In this range, the first gear portion 41 does not contact the second gear portion 42, and the third gear portion 51 does not contact the fourth gear portion 52. During this time, only the first pivot element 20 provides torsion to the rotating shaft structure 1.

In this embodiment, the first pivot element 20 uses a prior art torsion generator. Therefore, the torsion value of the segment IJ in FIG. 2 equals that of the segment AB in FIG. 1.

It is noted that the first pivot element 20 can comprise a torsion generator which generates less torsion (smaller than that of segment IJ in FIG. 2) to reduce the torsion value and to make it easier for the user to open the cover 92.

(2) the pivoting angle θ increases from 90 degrees to less than 142 degrees (90°<θ<142°):

In FIG. 3 to FIG. 5, the pivoting angle θ is 90 degrees in every figure. At this time, the first gear portion 41 just contacts the second gear portion 42. Afterwards, when the pivoting angle θ continues to increase from 90 degrees, the second pivot element 30 is driven when the first gear portion 41 drives the second gear portion 42. The total torsion equals the sum of the torsion provided by the first pivot element 20 and the second pivot element 30 to provide increased torsion support (comparing segment CD in FIG. 1 with segment KL in FIG. 2) to the rotating shaft structure 1, making it particularly suitable for a foldable portable electronic device 90 with a touch screen.

In addition, when the user continues to open the cover from a pivoting angle θ of 90 degrees (the direction is shown by an arrow in FIG. 5), the first gear portion 41 in FIG. 5 rotates counterclockwise to drive the second gear portion 42, and the second gear portion 42 rotates clockwise to drive the second pivot element 30. The crisscrossed region in the upper right section of FIG. 2 illustrates the torsion generated by the second pivot element 30. When the first gear portion 41 and the third gear portion 51 have a fixed relative position, the second gear portion 42 and the fourth gear portion 52 have a fixed relative position as well. Therefore, when the first gear portion 41 drives the second gear portion 42, both the third gear portion 51 and the fourth gear portion 52 rotate with the same angle.

Figure 1:
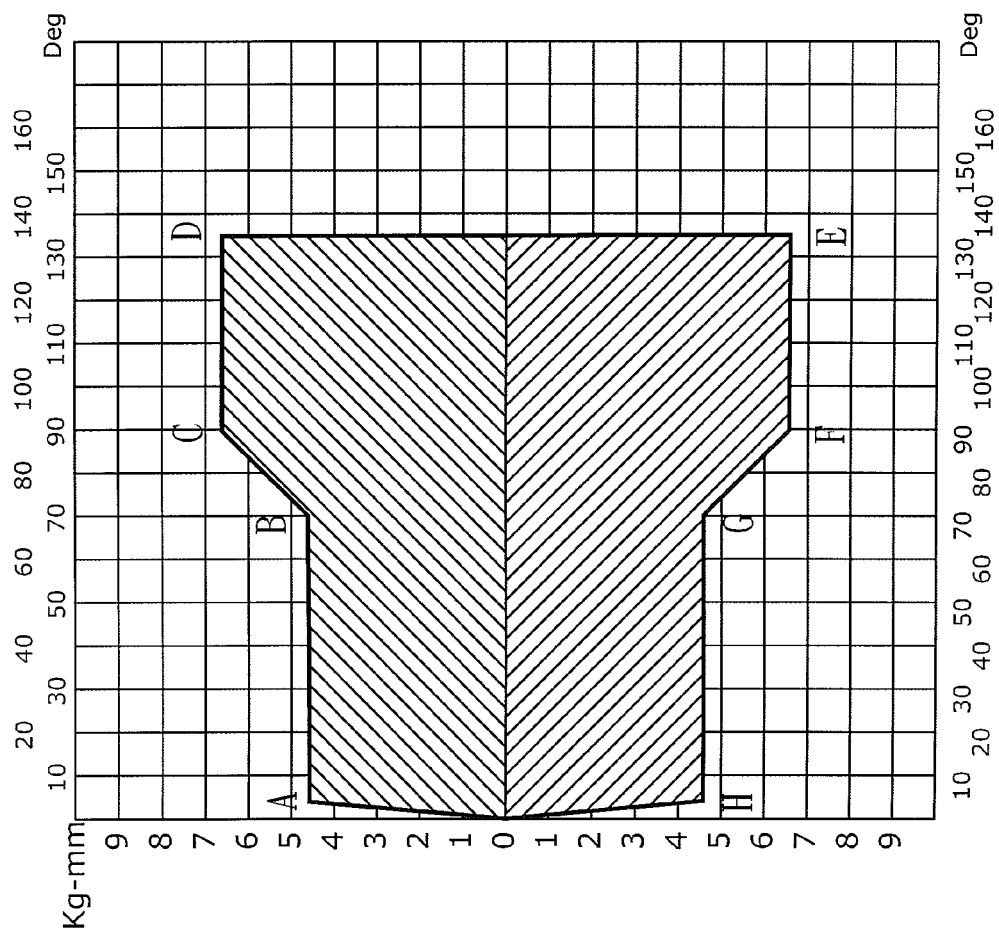
FIG. 1 illustrates a view of a relation between the pivoting angle and the torsion value of a prior art rotating shaft structure for a screen.

It is noted that the pivoting angle .theta., where the torsion starts increasing as compared with that of FIG. 1 (that is, the time when the first gear portion 41 just contacts with the second gear portion 42), is not necessarily 90 degrees. The pivoting angle θ can be adjusted by changing the relative position of the first gear portion 41 and the second gear portion 42.

Figure 6:
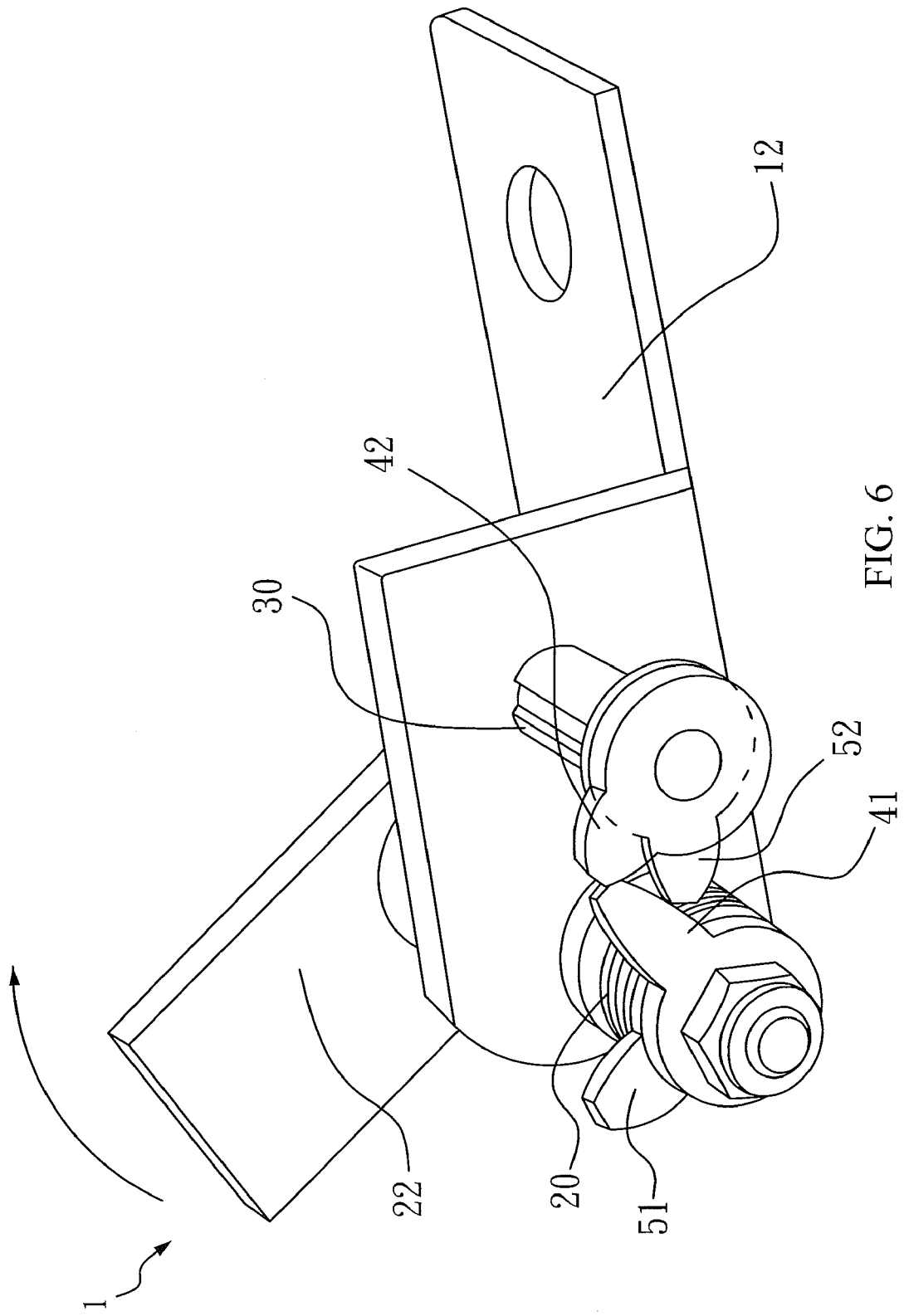
FIG. 6 illustrates a 3D view of the rotating shaft structure having a pivoting angle of 142 degrees when the cover is open in the present invention.

(3) the pivoting angle θ equals 142 degrees(θ=142°):

Please refer to FIG. 6 for a 3D view of the rotating shaft structure 1 when the pivoting angle equals 142 degrees. At this time, the first gear portion 41 just departs from the second gear portion 42. Therefore, only the first pivot element 20 provides torsion to the rotating shaft structure 1. When the user tries to open or close the cover around this angle, the first gear portion 41 and the second gear portion 42 do not contact each other.

It is noted that this step (with the first gear portion 41 and the second gear portion 42 not contacting each other) can be skipped if the maximum pivoting angle θ of the foldable portable electronic device 90 is set to be less than 142 degrees. For example, if the maximum pivoting angle θ is 135 degrees, then the pivoting angle θ can reach only 135 degrees. That is, the first gear portion 41 always contacts the second gear portion 42 (shown as the segment LM in FIG. 2).

Figure 7:
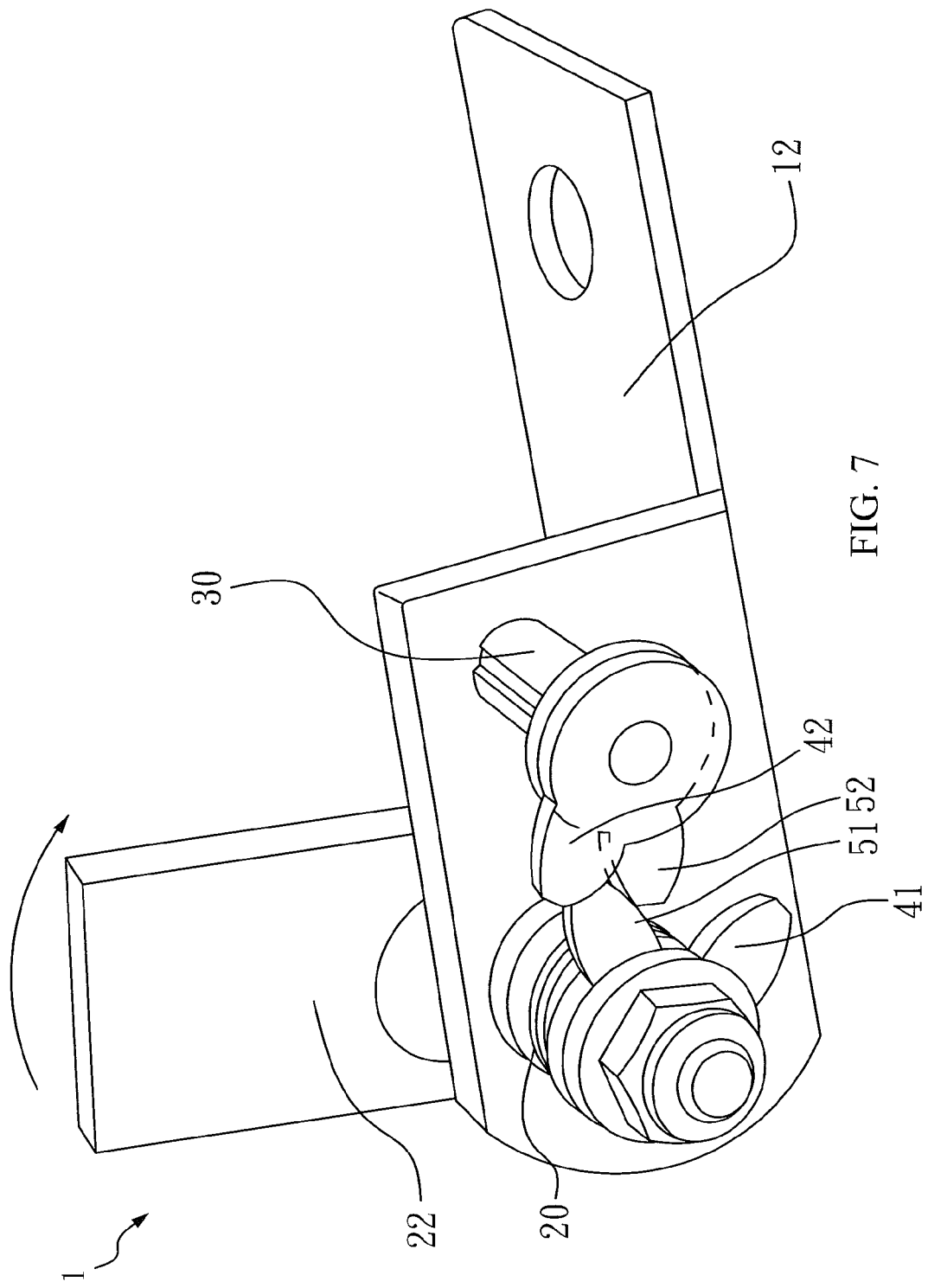
FIG. 7 illustrates a 3D view of the rotating shaft structure having a pivoting angle of 77 degrees when the cover is closed in the present invention.

2. The Cover Closing Stage (4) the pivoting angle θ decreases from 142 degrees to larger than 77 degrees (142°<θ<77°):

The transition is shown from FIG. 6 to FIG. 7. That is, the user continues to close the cover from a pivoting angle θ of 142 degrees (the direction is shown by an arrow in FIG. 6). During this angle range, the first gear portion 41 does not contact the second gear portion 42, and the third gear portion 51 does not contact the fourth gear portion 52 either. Therefore, at this time, only the first pivot element 20 provides torsion to the rotating shaft structure 1.

In this embodiment, the first pivot element 20 uses a torsion generator which is the same as that described in the prior art. Therefore, in this embodiment, the torsion value of the segment MN in FIG. 2 equals that of the segment EF in FIG. 1.

(5) the pivoting angle θ decreases from 77 degrees to larger than 25 degrees (77°<θ<25°):

In step 2, when the first gear portion 41 drives the second gear portion 42, the fourth gear portion 52 also rotates with a corresponding angle to reach a position to let the third gear portion 51 just contact the fourth gear portion 52.

Please refer to FIG. 7. When the pivoting angle θ is exactly 77 degrees, the third gear portion 51 just contacts the fourth gear portion 52. Afterwards, when the user continues to close the cover such that the pivoting angle θ decreases to less than 77 degrees, the second pivot element 30 is driven when the third gear portion 51 drives the fourth gear portion 52. The total torsion equals the sum of the torsion provided by the first pivot element 20 and the second pivot element 30 to provide increased torsion support to the rotating shaft structure 1. Therefore, the present invention can provide better support to the rotating shaft structure 1 (comparing segment GH in FIG. 1 with segment OP in FIG. 2) than the prior art, thereby preventing accidental falling of the cover 92 due to the user releasing his/her hand and the resultant damage to the internal structure of the notebook computer.

Furthermore, when the user continues to close the cover from the pivoting angle θ of 77 degrees, the third gear portion 51 in FIG. 7 rotates clockwise to drive the fourth gear portion 52, and the fourth gear portion 52 rotates counterclockwise to drive the second pivot element 30. The crisscrossed region in the lower left section of FIG. 2 illustrates the torsion generated by the second pivot element 30.

When the first gear portion 41 and the third gear portion 51 have a fixed relative position, the second gear portion 42 and the fourth gear portion 52 have a fixed relative position as well. Therefore, when the third gear portion 51 drives the fourth gear portion 52, both the first gear portion 41 and the second gear portion 42 rotate with the same angle.

It is noted that the pivoting angle θ where the torsion starts increasing, as compared with that of FIG. 1 (that is, the time when the third gear portion 51 just contacts with the fourth gear portion 52), is not necessarily 77 degrees. The pivoting angle θ can be adjusted by changing the relative position of the third gear portion 51 and the fourth gear portion 52.

Figure 8:
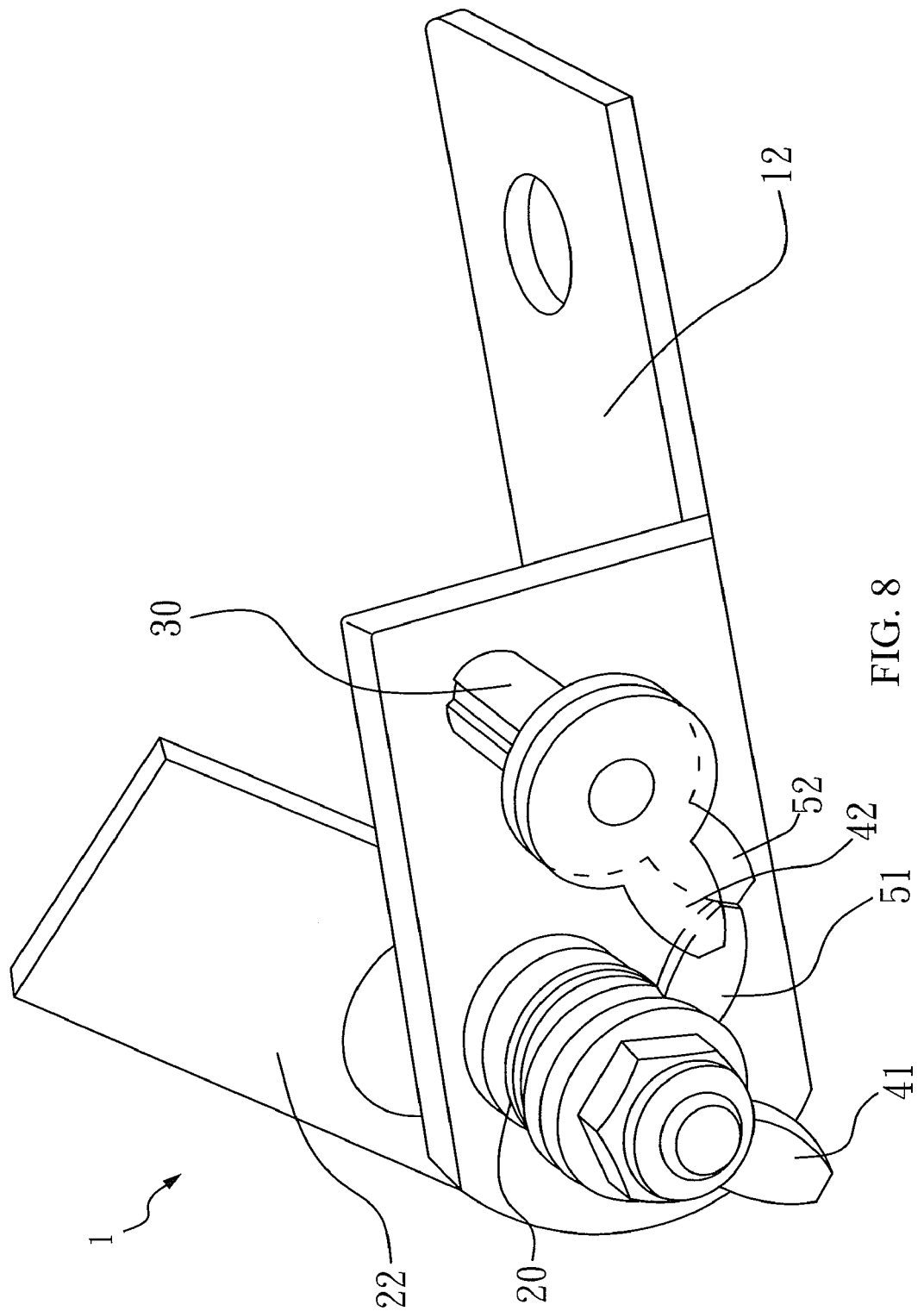
FIG. 8 illustrates a 3D view of the rotating shaft structure having a pivoting angle of 25 degrees when the cover is closed in the present invention.

(6) the pivoting angle θ decreases to less than 25 degrees (25°>θ):

Please refer to FIG. 8 for a 3D view of the rotating shaft structure 1 when the pivoting angle equals 25 degrees. At this time, the third gear portion 51 departs from the fourth gear portion 52. Therefore, only the first pivot element 20 provides torsion to the rotating shaft structure 1. When the user tries to open or close the cover around this angle, the first gear portion 41 and the second gear portion 42 do not contact each other.

Step 1 to step 6 form a cyclic flow, which repeats once again when the user opens the cover to use the notebook computer and then closes the cover to store the notebook computer.

In summary, the rotating shaft structure 1 in the present invention uses a gear set as a linking element. The first gear portion 41 engages with the second gear portion 42 in a specific angle range where the cover is opening (that is, a specific opening angle range ), so the first pivot element 20 and the second pivot element 30 can work together to increase the torsion of the rotating shaft structure 1. The third gear portion 51 engages with the fourth gear portion 52 in a specific angle range where the cover is closing (that is, a specific closing angle range), so the first pivot element 20 and the second pivot element 30 can work together to increase the torsion of the rotating shaft structure 1.

It is noted that the specific opening angle range and the specific closing angle range can be varied by adjusting the relative positions of the first gear portion 41, the second gear portion 42, the third gear portion 51, and the fourth gear portion 52 with respect to one another to meet the requirements of the designer.

Furthermore, in this embodiment, while each gear portion has one single tooth engaged with one tooth of another gear portion, each gear portion can have multiple teeth engaged with those of another gear portion as required. For example, when the specific opening angle range is increased, each one of the first gear portion 41 and the second gear portion 42 can comprise two teeth.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A rotating shaft structure for a foldable portable electronic device, the foldable portable electronic device comprising a body and a cover pivotally connected with each other to form a pivoting angle between the body and the cover, with the body and cover pivotable through an operative range between a closed and an operative state, with the rotating shaft structure comprising: a fixing element having a fixing base and a pivot hole disposed thereon, with the fixing base connected to the foldable portable electronic device; and a torsion generating component comprising: a torsion generator pivotally connected on the fixing base via the pivot hole for the torsion generator to pivot in relation to the fixing base, wherein the torsion generator generates a torsion which changes along with the pivoting angle; a linking mechanism; and an auxiliary torsion generating structure; wherein when the pivoting angle is in a specific pivoting angle range less than the operative range, the torsion generator drives the auxiliary torsion generating structure via the linking mechanism to increase the torsion of the rotating shaft structure, and wherein when the pivoting angle is outside the specific pivoting angle range, the auxiliary torsion generating structure does not increase the torsion, wherein the linking mechanism is a gear set, wherein the gear set comprises a first gear portion and a second gear portion, wherein the first gear portion is connected to the torsion generator, and wherein the second gear portion is connected to the auxiliary torsion generating structure, and wherein when the specific pivoting angle range is in the specific opening angle range, the first gear portion contacts and drives the second gear portion.

2. The rotating shaft structure as claimed in claim 1, wherein the specific pivoting angle range comprises a specific opening angle range between 80 degrees and 150 degrees.

3. The rotating shaft structure as claimed in claim 2, wherein the specific pivoting angle range further comprises a specific closing angle range between 80 degrees and 20 degrees.

4. The rotating shaft structure as claimed in claim 3, wherein the gear set further comprises a third gear portion and a fourth gear portion; wherein the third gear portion is connected to the torsion generator, and wherein the fourth gear portion is connected to the auxiliary torsion generating structure; and wherein when the specific pivoting angle range is in the specific closing angle range, the third gear portion contacts and drives the fourth gear portion.

5. The rotating shaft structure as claimed in claim 1, wherein the body is pivotally connected to the cover via the torsion generator, and wherein the fixing base is fixed to the body.

6. A rotating shaft structure for a foldable portable electronic device, the foldable portable electronic device comprising a body and a cover pivotally connected with each other to form a pivoting angle between the body and the cover, with the body and cover pivotable through an operative range between a closed and an operative state, with the rotating shaft structure comprising: a fixing element comprising a fixing base and a pivot hole, with the fixing base connected to the foldable portable electronic device; a first pivot element pivoted in relation to the fixing element via the pivot hole; and a second pivot element disposed on the fixing element and adjacent to the first pivot element; wherein when the pivoting angle is in a specific pivoting angle range less than the operative range, the first pivot element is pivoted to drive the second pivot element to increase the torsion of the rotating shaft structure, and wherein when the pivoting angle is outside the specific pivoting angle range, the second pivot element does not increase the torsion, wherein the first pivot element and the second pivot element jointly comprise a gear set, wherein the gear set comprises a first gear portion and a second gear portion, wherein the first pivot element comprises the first gear portion, and wherein the second pivot element comprises the second gear portion, and wherein when the specific pivoting angle range is in the specific open angle range, the first gear portion contacts and drives the second gear portion.

7. The rotating shaft structure as claimed in claim 6, wherein the specific pivoting angle range comprises a specific opening angle range between 80 degrees and 150 degrees.

8. The rotating shaft structure as claimed in claim 7, wherein the specific pivoting angle range further comprises a specific closing angle range between 80 degrees and 20 degrees.

9. The rotating shaft structure as claimed in claim 8, wherein the gear set comprises a third gear portion and a fourth gear portion; wherein the first pivot element comprises the third gear portion, and the second pivot element comprises the fourth gear portion; and wherein when the specific pivoting angle range is in the specific closing angle range, the third gear portion contacts and drives the fourth gear portion.

10. The rotating shaft structure as claimed in claim 6, wherein the body is pivotally connected to the cover via the first pivot element.

11. A foldable portable electronic device comprising: a body; a cover pivoted to the body to form a pivoting angle, with the body and cover pivotable through an operative range between a closed and an operative state; a fixing element comprising a fixing base and a pivot hole, with the fixing base connected to the body; a first pivot element pivoted in relation to the fixing element via the pivot hole; and a second pivot element disposed on the fixing element and adjacent to the first pivot element; wherein when the pivoting angle is in a specific, pivoting angle range less than the operative range, the first pivot element is pivoted to drive the second pivot element to increase torsion, and wherein when the rotating shaft structure pivoting angle is outside the specific pivoting angle range, the second pivot element does not increase the torsion, wherein the first pivot element and the second pivot element jointly comprise a gear set, wherein the gear set comprises a first gear portion and a second gear portion, wherein the first pivot element comprises the first gear portion, and wherein the second pivot element comprises the second gear portion, and wherein when the specific pivoting angle range is in the specific open angle range, the first gear portion contacts and drives the second gear portion.

12. The foldable portable electronic device as claimed in claim 11, wherein the specific pivoting angle range comprises a specific opening angle range between 80 degrees and 150 degrees.

13. The foldable portable electronic device as claimed in claim 12, wherein the specific pivoting angle range further comprises a specific closing angle range between 80 degrees and 20 degrees.

14. The foldable portable electronic device as claimed in claim 13, wherein the gear set comprises a third gear portion and a fourth gear portion; wherein the first pivot element comprises the third gear portion, and wherein the second pivot element comprises the fourth gear portion; and wherein when the specific pivoting angle range is in the specific closing angle range, the third gear portion contacts and drives the fourth gear portion.

* * * * *